(12) United States Patent
Yu et al.

(10) Patent No.: US 11,332,904 B2
(45) Date of Patent: May 17, 2022

(54) LATERAL AND CONTINUOUS MEASUREMENT METHOD FOR SOIL PARAMETERS IN SOFT SOIL FIELD

(71) Applicant: DALIAN UNIVERSITY OF TECHNOLOGY, Liaoning (CN)

(72) Inventors: Long Yu, Liaoning (CN); Yunrui Han, Liaoning (CN); Qing Yang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 35 days.

(21) Appl. No.: 17/252,107

(22) PCT Filed: Jul. 17, 2019

(86) PCT No.: PCT/CN2019/096258
§ 371 (c)(1),
(2) Date: Dec. 14, 2020

(87) PCT Pub. No.: WO2021/000345
PCT Pub. Date: Jan. 7, 2021

(65) Prior Publication Data
US 2021/0172140 A1 Jun. 10, 2021

(30) Foreign Application Priority Data
Jul. 1, 2019 (CN) .......................... 201910586774.X (51) Int. Cl.
*E02D 1/02* (2006.01)
*F16L 1/16* (2006.01)
(Continued)

(52) U.S. Cl.
CPC .............. *E02D 1/025* (2013.01); *B63C 11/52* (2013.01); *E02D 1/022* (2013.01); *E02F 5/105* (2013.01); *F16L 1/16* (2013.01)

(58) Field of Classification Search
CPC . E02D 1/02; E02D 1/022; E02D 1/025; F16L 1/12; F16L 1/123; F16L 1/16;
(Continued)

(56) References Cited

U.S. PATENT DOCUMENTS 4,069,679 A    1/1978  Manley
5,444,670 A *  8/1995  Douglas ............... G01N 29/348
                                              367/90
(Continued)

FOREIGN PATENT DOCUMENTS

CN    1900682 A    1/2007
CN    1940554 A    4/2007
(Continued)

*Primary Examiner* — Frederick L Lagman
(74) *Attorney, Agent, or Firm* — Muncy, Geissler, Olds & Lowe, P.C.

(57) ABSTRACT

The present invention provides a lateral and continuous measurement method for soil parameters in a soft soil field. The method mainly comprises the following measurement steps: arranging soil strength measuring apparatuses at the front end of a towing apparatus; arranging soil strain softening relationship measuring apparatuses at the bottom end of the towing apparatus; and measuring interface friction parameters between the soil and a structure. The towing apparatus actively or passively moves in a soft soil layer to ensure that the towing apparatus partially penetrates into the to-be-measured soil layer during movement; and the penetration depth of the towing apparatus is controlled by adjusting counterweight above the towing apparatus and a towing angle.

10 Claims, 5 Drawing Sheets

(51) Int. Cl.
*B63C 11/52* (2006.01)
*E02F 5/10* (2006.01)

(58) Field of Classification Search
CPC . F16L 1/165; F16L 1/265; B63C 11/52; E02F 5/105
See application file for complete search history.

(56) References Cited

U.S. PATENT DOCUMENTS

| | | | | |
|---|---|---|---|---|
| 5,970,901 A | * | 10/1999 | Bruce | G01V 1/38 73/152.01 |
| 9,422,690 B2 | * | 8/2016 | Wilson | E02F 5/14 |
| 2008/0298173 A1 | * | 12/2008 | Guigne | E02D 1/025 367/16 |

FOREIGN PATENT DOCUMENTS

| | | | | | |
|---|---|---|---|---|---|
| CN | 2919231 | Y | | 7/2007 | |
| CN | 206177937 | U | | 5/2017 | |
| CN | 109238877 | A | | 1/2019 | |
| CN | 110346535 | A | | 10/2019 | |
| CN | 110409399 | A | * | 11/2019 | ............. B63C 11/52 |
| CN | 110424363 | A | * | 11/2019 | ............. E02D 1/022 |
| CN | 110438967 | A | * | 11/2019 | ............. B63C 11/52 |
| EP | 0697603 | A1 | * | 2/1996 | |
| GB | 1457071 | A | | 12/1976 | |
| JP | 60131016 | A | | 7/1985 | |
| JP | 04363408 | A | | 12/1992 | |

\* cited by examiner

LATERAL AND CONTINUOUS MEASUREMENT METHOD FOR SOIL PARAMETERS IN SOFT SOIL FIELD

TECHNICAL FIELD

The present invention belongs to the technical field of research on geotechnical, geological and environmental engineering, and relates to a lateral and continuous measurement method for soil parameters in a soft soil field. The method is especially suitable for the investigation of soil parameters before design and construction of underwater pipelines.

BACKGROUND

Accurate measurement of soil parameters is a foundation of implementation of all projects. As a kind of soil with poor engineering properties, soft soil generally has the characteristics of high natural moisture content, large natural void ratio, high compressibility, low shear strength, small coefficient of consolidation, long time for consolidation, high sensitivity and poor permeability. Therefore, the design and construction of the soft soil field have high risks. In engineering practice, the accurate measurement of the soil parameters on the soft soil field is an important way to reduce engineering risks and optimize engineering design, and rapid, continuous and accurate measurement is not only an important test of experimental methods, but also a major problem in the engineering field.

The soil parameters are traditionally obtained by acquiring a core sample through on-site gravity sampling or drill hole sampling and then measuring the related soil parameters through laboratory tests. However, the method is difficult to accurately estimate the soil properties of an actual field due to soil disturbance during the sampling and the limitations of an laboratory test method, which will inevitably adversely affect the projects, and even affect the safety of the projects. In recent years, in-situ test methods have been developed rapidly; cone penetration test (CPT, CPTU) methods, in-situ T-bar or Ball-bar test methods have been widely used; and the test accuracy has also been obviously increased. Especially for the soft soil field, these test methods reflect unparalleled superiority. However, these test methods obtain the soil parameters for a certain target point through vertical single penetration or cyclic penetration of a measuring device, which has good applicability for the measurement of the soil parameters at a single target point. However, for large-scale and long-distance fields, the results obtained by the existing test methods cannot reflect the lateral change of the soil parameters. The change in relationship of the soil parameters in the direction parallel to the earth surface can be obtained to a certain extent by forming more vertical drilling points, but the resulting increase in engineering cost and time consumption makes the solution impracticable in actual projects. In combination with the problems in the current projects, it is urgent to find a test method which can realize lateral, long-distance and continuous measurement of the soil parameters. The method is of great significance to the design and stability evaluation of the projects constructed on the soft soil field.

SUMMARY

With respect to the problem that the existing test method cannot realize lateral and long-distance measurement of soil parameters, the present invention proposes a method which can realize lateral and continuous measurement of the soil parameters. The method is applicable to the lateral and continuous measurement of the soil parameters of weak soil layers at the bottoms of lakes, swamps, rivers and oceans, and ultimately serves for the projects of design and construction of breakwaters, submarine oil and gas pipelines, electrical cables and optical cables depending on the soil parameters of long-distance shallow layers in the direction parallel to the earth surface. Especially, with the increase of the development of oil and gas resources in deep sea, the method proposed by the present invention is of great significance to measure submarine soil parameters and apply to the design and stability evaluation of engineering facilities such as submarine pipelines and submarine cables.

The technical solution of the present invention is:

A lateral and continuous measurement method for soil parameters in a soft soil field mainly comprises the following measurement steps:

step 1: arranging soil strength measuring apparatuses at the front end of a towing apparatus: a plurality of soil strength measuring apparatuses are installed at the front end of the towing apparatus; the installation number is increased with the increase of the depth of a to-be-measured soil layer; an installation direction points to the moving direction of the towing apparatus; voltage signals of the soil strength measuring apparatuses during lateral movement are collected; the resistance of the soil strength measuring apparatuses is determined according to a conversion relationship between the measured voltage signals and the resistance of the soil strength measuring apparatuses; and then the soil strength which changes continuously along the movement direction is obtained through the relationship between the obtained resistance and the soil strength;

step 2: arranging soil strain softening relationship measuring apparatuses at the bottom end of the towing apparatus: a plurality of soil strain softening relationship measuring apparatuses are installed at the bottom end of the towing apparatus; the installation direction points to the movement direction of the towing apparatus to ensure that the plurality of soil strain softening relationship measuring apparatuses are positioned on the same horizontal line; when the towing apparatus moves in the soil, the soil in the same position is disturbed by the plurality of soil strain softening relationship measuring apparatuses at the bottom end of the towing apparatus; the moving resistance of the soil strain softening relationship measuring apparatuses is obtained through the conversion relationship between the voltage signals and the resistance measured by the soil strain softening relationship measuring apparatuses; for the soil in the same position, the relationship between the resistance of the soil strain softening relationship measuring apparatuses and the number of the corresponding soil strain softening relationship measuring apparatuses of the disturbed soil is obtained; the relationship between the resistance and accumulated plastic strain is obtained in combination with the relationship between the number of the soil strain softening relationship measuring apparatuses of the disturbed soil and the accumulated plastic strain of the soil; the relationship between the soil strength and the accumulated plastic strain, i.e., the soil strain softening relationship, is finally determined in combination with the relationship between the resistance of the soil strain softening relationship measuring apparatuses and the soil strength;

step 3: measuring interface friction parameters between the soil and a structure: the bottom end of the towing apparatus is provided with a plurality of grooves; friction plates are arranged in the grooves; the friction plates are connected with tension-compression sensors installed in the grooves to ensure that the lower surfaces of the friction plates come into contact with the soil and are on the same horizontal line; one tension-compression sensor is parallel to the movement direction, and the other tension-compression sensor is perpendicular to the movement direction; when the towing apparatus moves in the soil, the voltage signals of the tension-compression sensors are directly measured, and the friction force and vertical pressure of the soil on the friction plates are obtained through the conversion relationship between the voltage signals and the force; for clay, the relationship between the friction resistance of the friction plates and accumulated relative displacement is finally obtained in combination with the relationship between the friction resistance of the friction plates in the same position in the soil layer and the number of the corresponding friction plates of the disturbed soil and the relationship between the number of the friction plates of the disturbed soil and the relative displacement of the soil; for sandy soil, a friction coefficient between the friction plates and the soil is obtained through the relationship between the friction resistance of the friction plates in the same position in the soil layer and the vertical pressure on the soil, and the relationship between the friction coefficient of the friction plates and the accumulated relative displacement is finally obtained in combination with the relationship between the number of the friction plates of the disturbed soil in the same position and the relative displacement of the soil;

step 4: the towing apparatus actively or passively moves in a soft soil layer to ensure that the towing apparatus partially penetrates into the to-be-measured soil layer during movement; and the penetration depth of the towing apparatus is controlled by adjusting counterweight above the towing apparatus and a towing angle.

The soil strength measuring apparatuses are T-bar penetrometers, Ball-bar penetrometers or cone penetration test penetrometers (CPT and CPTU).

The soil strain softening relationship measuring apparatuses are T-bar penetrometers or Ball-bar penetrometers.

The method proposed by the present invention has the major advantage of obtaining continuous soil parameters in the horizontal direction, but it should be noted that the soil parameters described above are only the soil parameters that are mainly concerned in the embodiments, not all available soil parameters. The data obtained by the matched sensors in the embodiments can also be used for determining other parameters such as over-consolidation ratio, sensitivity, relative density of sand, internal friction angle, compression modulus of soil, deformation modulus, undrained modulus of saturated clay, bearing capacity of foundation, bearing capacity of single pile and sand liquefaction discrimination parameter.

The present invention has the following beneficial effects:

1) The soil strength is the basic parameter of engineering design and construction. According to the method provided by the present invention, the strength measuring apparatuses (T-bar penetrometers, Ball-bar penetrometers or CPT probes) are horizontally arranged and configured to laterally penetrate into the soil layer along the horizontal direction, so as to continuously obtain the soil strength parameters within the towing distance. The method provided by the present invention breaks through the limitation that the traditional single-point vertical measurement method cannot obtain the lateral and continuous soil strength parameters, improves the engineering safety and reduces the time cost and economic cost required in actual engineering measurement.

2) Strain softening parameters are important mechanical parameters of soil in the soft soil field. By applying the method provided by the present invention, the in-situ measurement of the strain softening parameters can be completed through one towing test, and the lateral and continuous soil strain softening parameters within the measurement range can be obtained. The method avoids the influence of the traditional single-point vertical measurement method on the measurement results of the softening parameters due to the particularity of a sampling point, and has important reference value for analyzing the submarine structure and the stability of the submarine slope.

3) The interface friction parameters between the soil and the structure have always been the focus and difficulty of ocean engineering design and stability analysis. The method provided by the present invention can be used to complete the in-situ measurement of the interface friction parameters between the soil and the structure through a towing test. Meanwhile, through the horizontal linear arrangement of the plurality of friction plates, the friction parameters and its degradation relation of the soil under different disturbance degrees can be obtained, which provides a parameter basis for the research on the interaction between the soil and the structure in engineering practice.

4) According to the method provided by the present invention, the lateral long-distance continuous measurement of the soil parameters can be realized, and the measured parameters can be used to guide the design and construction of projects such as breakwaters, submarine oil and gas pipelines, electrical cables and optical cables. Especially, with the increase of the development of oil and gas resources in deep sea, the method proposed by the present invention is of great significance to measure submarine soil parameters and apply to the design and stability evaluation of engineering facilities such as submarine pipelines and submarine cables.

DESCRIPTION OF DRAWINGS

FIG. 8($a$) is a schematic diagram of resistance change measured in different positions based on a T-bar probe provided by embodiments of the present invention.

FIG. 8($b$) is a schematic diagram of a resistance degradation relation measured in a position based on a T-bar probe provided by embodiments of the present invention.

FIG. 9(*a*) is a schematic diagram of pressure change measured based on a vertical pressure sensor of a friction plate provided by embodiments of the present invention.

FIG. 9(*b*) is a schematic diagram of the changing friction force measured based on a lateral pressure sensor of a friction plate provided by embodiments of the present invention.

FIG. 9(*c*) is a schematic diagram of the changing friction coefficient obtained based on a friction plate test provided by embodiments of the present invention.

FIG. 10(*a*) is a schematic diagram of a shear stress degradation relation obtained based on a friction plate test provided by embodiments of the present invention.

FIG. 10(*b*) is a schematic diagram of a friction coefficient degradation relation obtained based on a friction plate test provided by embodiments of the present invention.

In the figures: 1 towboat; 2 towrope terminal device (including handling winch, data collecting device and the like); 3 towrope (having high tensile strength and capable of transmitting sensor collecting signals); 4 towing structure body; 5 CPT probe; 6 friction plate; 7 T-bar probe; 8 towrope pull ring; 9 towing structure top plate; 10 towing structure hollow ribbed plate; 11 CPT probe installing support; 12 tension-compression sensor; 13 T-bar fixing support.

The towing structure body 4 can be towed through an external device such as a towboat to walk laterally, and can also be made to move laterally in actual measurement through a power system configured on the towing structure body. Sensor signals collected during walk of the towing apparatus can be directly transmitted to the measurement terminal device 2 through the towrope 3 for testing personnel to conduct real-time analysis. The sensor signals can also be stored in advance inside the towing apparatus during the test; and after the test is completed, the measurement data is analyzed.

DETAILED DESCRIPTION

To make the purpose, technical solutions and advantages of the embodiments of the present invention more clear, the technical solutions in the embodiments of the present invention will be clearly and fully described below in combination with the drawings in the embodiments of the present invention. The embodiments described herein are part of the embodiments of the present invention, not all of the embodiments. The components of the embodiments of the present invention described and shown in the drawings herein may be generally arranged and designed in various configurations.

Therefore, the following detailed description of the embodiments of the present invention provided in the drawings is not intended to limit the scope of the claimed present invention, and merely represents the selected embodiments of the present invention. Based on the embodiments in the present invention, all other embodiments obtained by those skilled in the art without contributing creative labor will belong to the protection scope of the present invention.

It should be noted that similar reference signs and letters indicate similar items in the following drawings. Therefore, a certain item will not be further defined and explained in the subsequent drawings once defined in one drawing.

In the illustration of the present invention, the position relationships indicated by "upper", "lower", "left", "right", and the like are the direction and position relationships shown based on the drawings, or the direction or position relationships usually placed when the product of the present invention is used, or direction or position relationships commonly understood by those skilled in the art only for facilitating the illustration in the embodiments, rather than indicating or implying that the indicated devices and components must have specific directions, and thus shall not be understood as a limitation to the present invention.

In addition, the sequential words such as "first", "second", . . . , "tenth" used in the present invention are only for facilitating the illustration, rather than being understood to indicate or imply relative importance.

Embodiments

The present embodiment is a lateral and continuous measurement method for soil parameters in a soft soil field. The test method provided by the present embodiment is simple, can realize lateral, long-distance and continuous measurement of soil parameters, and can serve the design and construction of underwater pipelines and cables.

Figure 1:
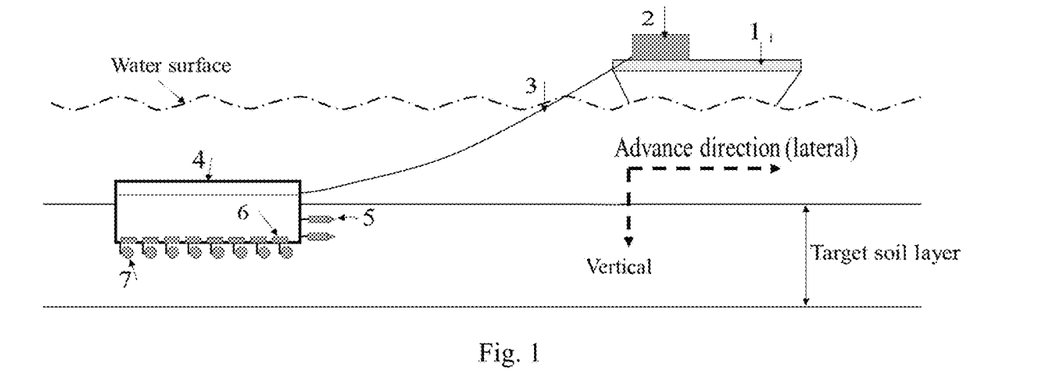
FIG. 1 is a schematic diagram of arrangement of a test device of a test method provided by embodiments of the present invention.

With reference to FIG. 1, the test method for lateral and continuous measurement for parameters in a soft soil field provided by the present embodiment can be completed through one-time horizontal towing of a towing apparatus. The towing apparatus comprises a towing structure body 4, CPT probes 5, friction plates 6, a T-bar probe 7, a towing pull ring 8, a towing structure top plate 9, a towing structure hollow ribbed plate 10, CPT probe installing supports 11, tension-compression sensors 12 and a T-bar fixing support 13. The CPT probe 5 is connected with the CPT probe installing support 11. The friction plates 6 are respectively connected with the tension-compression sensors 12 arranged laterally and vertically. The T-bar probe 7 is connected with the tension-compression sensors 12.

In combination with the drawings and technical solutions, the present embodiment comprises the following main steps:

Firstly, assembling CPT probes 5 at a front end of a towing apparatus

Figure 2:
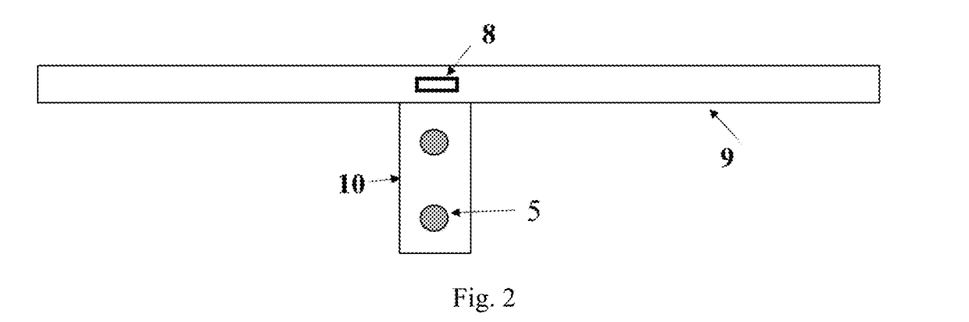
FIG. 2 is a front view of a layout of a CPT probe at a front end of a towing apparatus provided by embodiments of the present invention.
Figure 3:
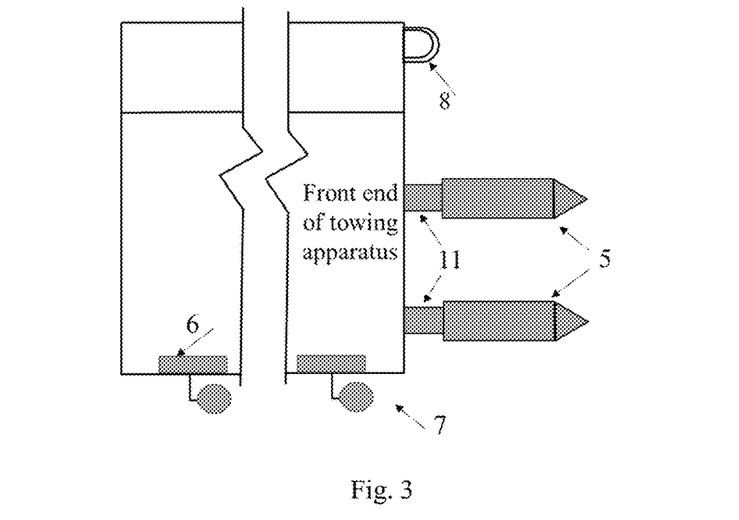
FIG. 3 is a side view of a layout of a CPT probe at a front end of a towing apparatus provided by embodiments of the present invention.

With reference to FIG. 1, FIG. 2 and FIG. 3, the towing structure body 4 adopts a stainless steel structure, and can be penetrated into a soil layer by a certain depth by controlling the counterweight above the towing structure body. The upper part of the towing structure body 4 is made of a thick-walled steel plate. The towing structure body 4 is hollow for arranging cables and applying counterweight lead blocks. A towrope 3 is connected with a pull ring 8 arranged in front of the top plate for towing the towing structure body 4. Two CPT probes 5 are connected with the CPT probe installing supports 11 and fixed on a ribbed plate on the front end of the towing structure body 4.

The CPT probes 5 are selected from international standard probes, that is, the top angle of the probes is 60°, and the bottom area is 10 $cm^2$.

Secondly, assembling T-bar probes 7 at a bottom end of the towing apparatus

Figure 4:
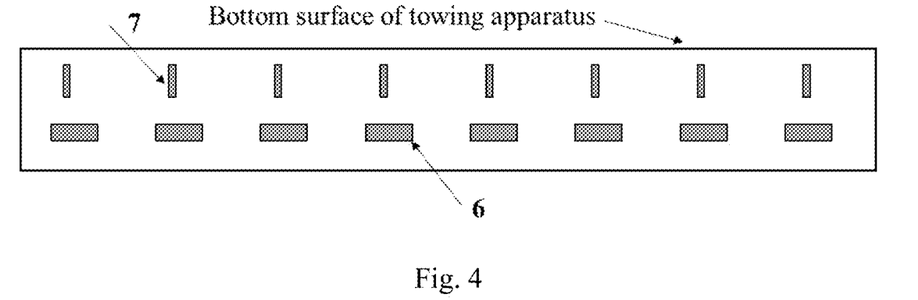
FIG. 4 is a schematic diagram of a layout of a device at a bottom end of a towing apparatus provided by embodiments of the present invention.
Figure 5:
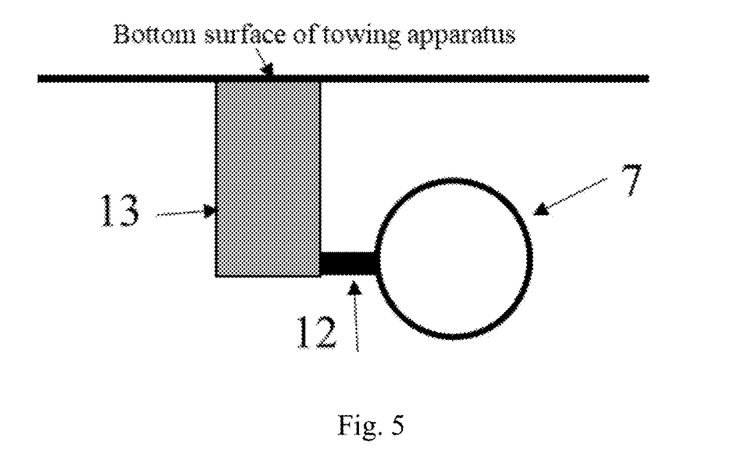
FIG. 5 is an arrangement diagram of a T-bar penetrometer at a local bottom end of a towing apparatus provided by embodiments of the present invention.

With reference to FIG. 4 and FIG. 5, eight T-bar supports 13 are arranged on the bottom end of the towing structure body 4 along the same straight line. The tension-compression sensors 12 are connected with the T-bar supports 13 and point to the movement direction of the towing apparatus. Eight T-bar probes 7 are respectively connected with the corresponding tension-compression sensors 12. The T-bar probes 7 are selected from stainless steel cylinders with a diameter of 4 cm and a length of 10 cm commonly used in projects.

Figure 6:
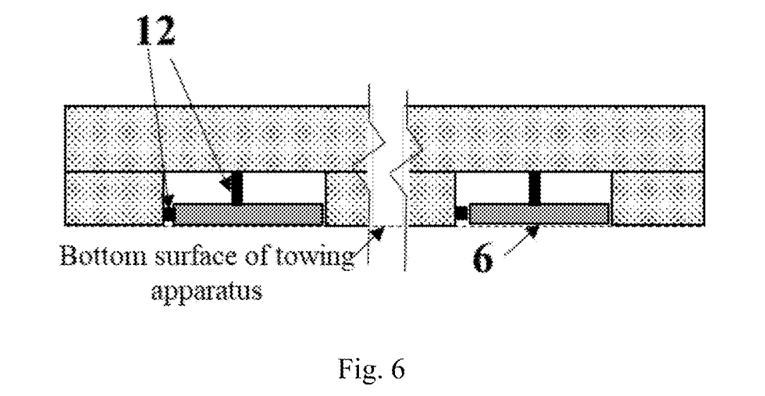
FIG. 6 is a schematic diagram of measurement of a friction plate in a local position of a bottom end of a towing apparatus provided by embodiments of the present invention.

Thirdly, assembling friction plates 6 at the bottom end of the towing apparatus With reference to FIG. 4 and FIG. 6, eight friction plates 6 are uniformly arranged longitudinally along the bottom end of the towing structure body 4. The friction plates 6 are respectively connected with the tension-compression sensors 12 arranged laterally and vertically and fixed in the bottom grooves of the towing apparatus. The friction plates 6 have a length of 10 cm and a width of 5 cm. The material used between adjacent friction plates 6 is the same as the material used for friction plates 6, and the distance between adjacent friction plates 6 is required to be the same as the length of the friction plates 6.

Fourthly, detecting and debugging device performance

After the soil parameter measurement device is arranged, the sensitivity and effectiveness of supporting facilities such as the sensors, a signal transmission towrope 3 and a collection towrope terminal device 2 are matched by pulling and pressing the CPT probes 5, the T-bar probes 7 and the friction plates 6. During the test, the data is sampled through the towrope terminal device 2. After the device is detected without any problem, a next test is prepared.

Fifthly, placing the towing apparatus onto the surface of a to-be-measured soil layer The assembled towing apparatus is slowly lowered on the surface of the soil through a gantry crane or other hoisting devices, and the lowering speed is controlled in the lowering process to avoid damaging the device due to large inertial force. After the towing apparatus is lowered to a designated position, the towrope 3 is lowered to allow the towboat 1 to move forward at low speed. The length of the towrope 3 is controlled so that the angle between the towrope 3 and a mud surface is small enough (generally within 30°). After the towrope 3 reaches a designated angle, the operation of the towrope terminal device 2 is inspected. After the device is inspected without any problem, a data collection device is started.

Sixthly, laterally towing the towing apparatus

After the test is ready, the towboat 1 is used to tow the towing apparatus along the designated direction. The speed and direction of the towboat are strictly controlled during towing, to ensure that the towboat 1 moves at uniform speed as far as possible. The collected data is observed, analyzed and saved frequently.

Seventhly, recovering the device

After the test is completed, the towboat 1 slowly moves back and the cable is stored at the same time. The towing apparatus is lifted upwards, and after the towing apparatus is recovered to a towboat deck, the device is inspected and stored.

Eighthly, processing measurement data

After one towing test is completed, the main soil parameters measured by the method of the present invention and the data analysis process are as follows:

1) Determination of Soil Shear Strength

Figure 7:
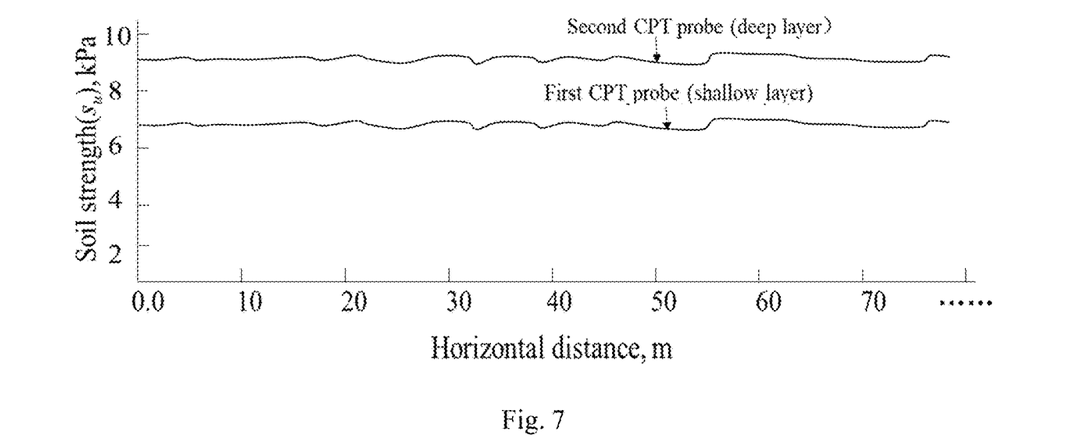
FIG. 7 is a schematic diagram for the change of soil strength measured based on a CPT probe provided by embodiments of the present invention.

As one of important soil parameters, the soil shear strength is mainly determined based on the measurement results of the cone penetration test (CPT) probes 5 arranged in the first step. The calculation process of the soil strength is as follows:

$$s_u = \frac{Q_c}{N_{Kt}A}$$

wherein $Q_c$ is cone tip resistance of the probe, N; A is cone bottom area of the probe, m²; $N_{kt}$ is the bearing capacity coefficient of the probe, which is from 11 to 19, generally 15.0. According to the test method provided by the present invention and the above strength calculation method, the relation of the soil strength after the test is shown in FIG. 7.

2) Determination of Soil Strain Softening Parameters

Figure 8A:
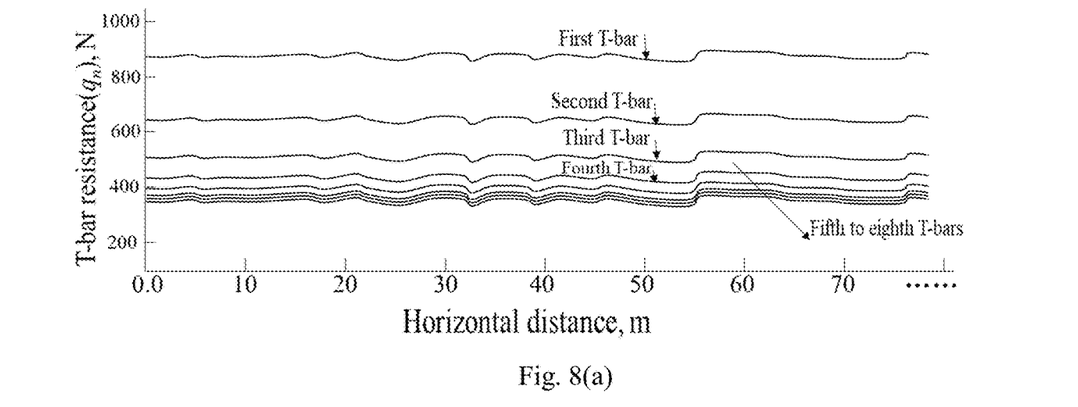

The strain softening parameters are calculated mainly based on analysis of the measurement data of the tension-compression sensors 12 corresponding to the T-bar probes 7 in different positions below the towing structure body 4. The resistance change of the T-bar probes 7 below the towing structure body 4 in the towing process is shown in FIG. 8(a).

The strain softening model of the soil is:

$$s_u = [\delta_{rem} + (1-\delta_{rem})e^{-3\xi/\xi_{95}}]s_{u0}$$

wherein $s_{u0}$ is the initial soil strength, kPa; $\delta_{rem}$ is the reciprocal of the sensitivity ($S_t$) of the soil; $\xi_{95}$ is the accumulated plastic strain value corresponding to 95% decrease in soil strength.

The initial soil strength ($s_{u0}$) is determined by the measurement result of the first T-bar probe 7 at the front end of the towing structure body 4. The calculation process is as follows:

$$S_{u0} = \frac{q_{T-bar}}{N_{T-bar}DL}$$

wherein $q_{T-bar}$ is the resistance of T-bar in the soil during horizontal movement; $N_{T-bar}$ is a bearing capacity coefficient of T-bar, which is from 9.14 to 11.94, generally 10.5; D is the diameter m of the selected T-bar; L is the length m of the T-head in the selected T-bar.

Figure 8B:
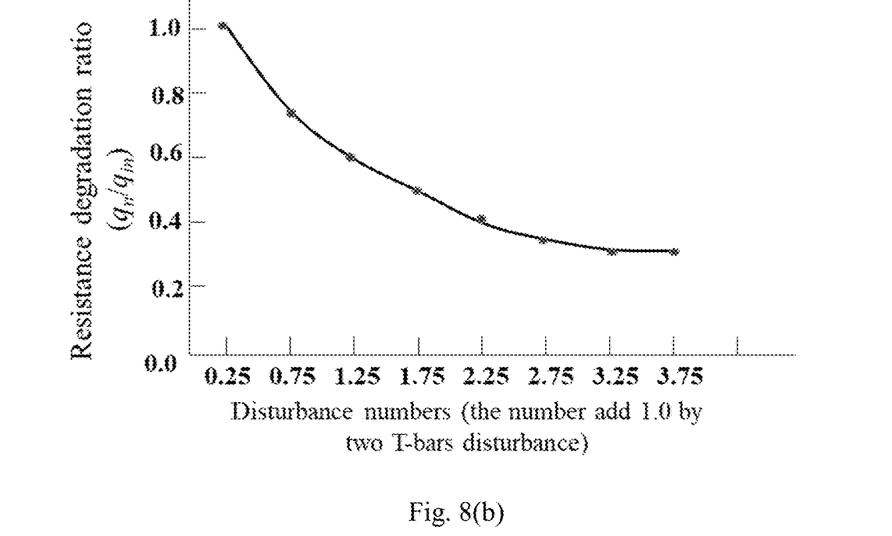

After the soil in the same position is disturbed by the T-bars in different positions at the bottom end of the towing structure body 4, the resistance degradation relation is as follows:

$$\frac{q_{(n)}}{q_{(in)}} = \frac{q_{rem}}{q_{in}} + \left(1 - \frac{q_{rem}}{q_{in}}\right)e^{-3(n-0.25)/N_{95}}$$

wherein n is the number of the T-bar probes 7 which pass through the same position along the movement direction. Considering the average strain value in the penetration process, n is generally counted from 0.25 and gradually accumulated with 0.5 according to the number of the T-bars, that is, the order of n is 0.25, 0.75 and 1.25 with incremental change. $q_n$ is the resistance value of the nth T-bar when counting along the movement direction; $q_{in}$ is the resistance value of the T-bar at the frontmost end of the movement direction; $g_{rem}$ is the resistance value of the rearmost T-bar (when the resistance is stable, the corresponding value is generally the measured resistance value of the last T-bar); and $N_{95}$ is the number of T-bars corresponding to 95% decrease in soil strength. After the soil in a certain position is disturbed by T-bars at different numbers, the measured resistance degradation is shown in FIG. 8(b), and $N_{95}$ can be obtained by analyzing the resistance degradation relation in FIG. 8(b).

The soil sensitivity ($S_t$) can be estimated according to the following formula:

$$S_t = \left(\frac{q_{in}}{q_{rem}}\right)^{1.4}$$

$\xi_{95}$ can be calculated through the following formula:

$$\xi_{95} = 2N_{95}\xi_{T-bar}$$

wherein $\xi_{T-bar}$ can be calculated according to the following formula:

$$\xi_{T-bar}=0.83 \log(S_t)+3.09$$

3) Determination of Interface Friction Parameters Between the Soil and the Structure The interface friction coefficient between the soil and the structure is obtained by measuring the pressure and friction resistance of the friction plates 6 at the bottom end of the towing apparatus. The soil friction parameters are acquired through the following steps:

3.1) Friction Parameters of Cohesive Soil

Figure 9A:
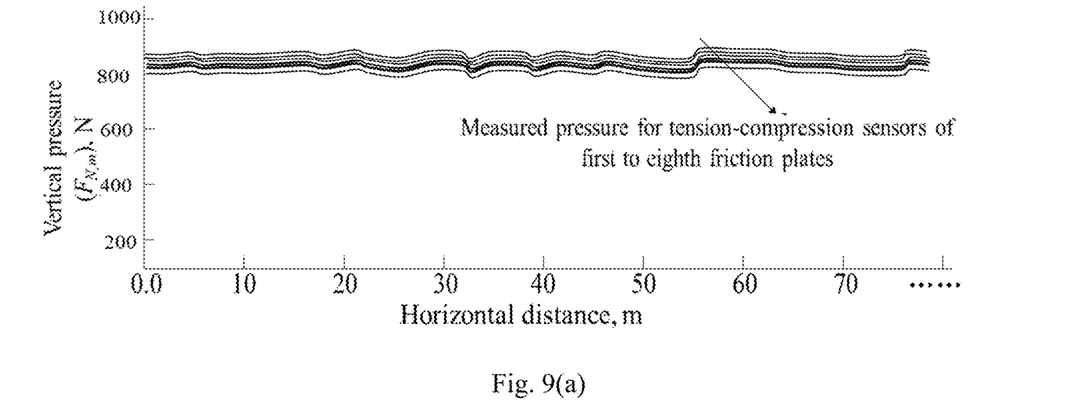
Figure 9B:
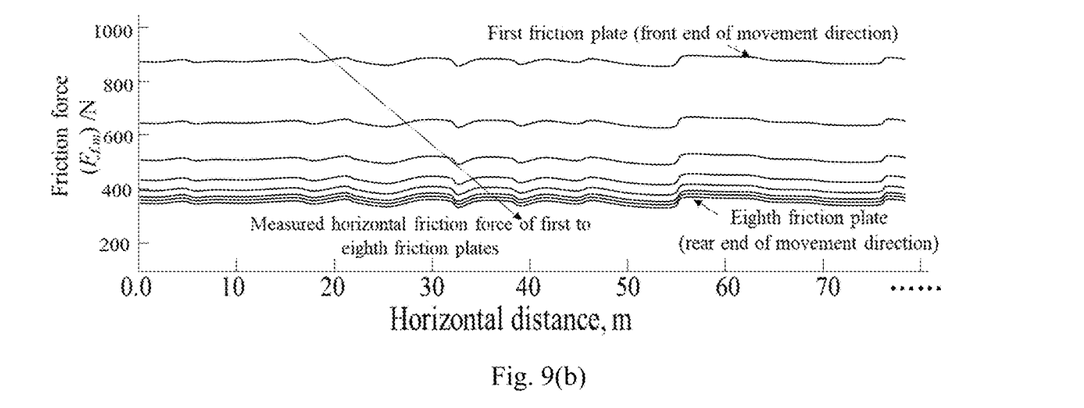

In the towing process of the towing apparatus along the movement direction, because the soil in the same position is under the action of friction of a plurality of friction plates 6 at the bottom end of the towing apparatus, different friction plates 6 have different disturbance to the soil, which leading to the friction resistances of the friction plates 6 are obviously different. The friction resistance and normal pressure of the friction plates 6 are obtained through the tension-compression sensors 12. In the test, the lateral friction force is shown in FIG. 9(b). The shear stress of the mth friction plate 6 in the same position in the soil is $$\tau_m = \frac{F_{f,m}}{WL}$$

In the formula, $F_{f,m}$ is the friction force of the mth friction plate 6 in the analysis position, N; W is the width of a single friction plate 6, m; L is the length of a single friction plate 6, m.

After the friction action of m friction plates 6, the friction displacement of the soil is $$S_{(m)}=mL$$

Figure 10A:
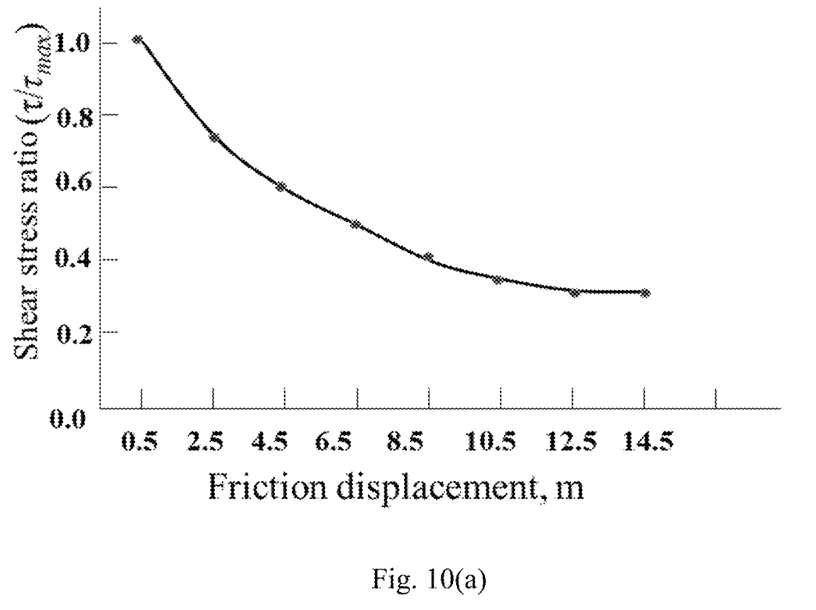

Through the above calculation, the degradation relation of the interface friction parameters (shear stress) between the soil and the structure of the cohesive soil material can be obtained, as shown in FIG. 10(a).

3.2) Friction Parameters of Sandy Soil

Figure 9C:
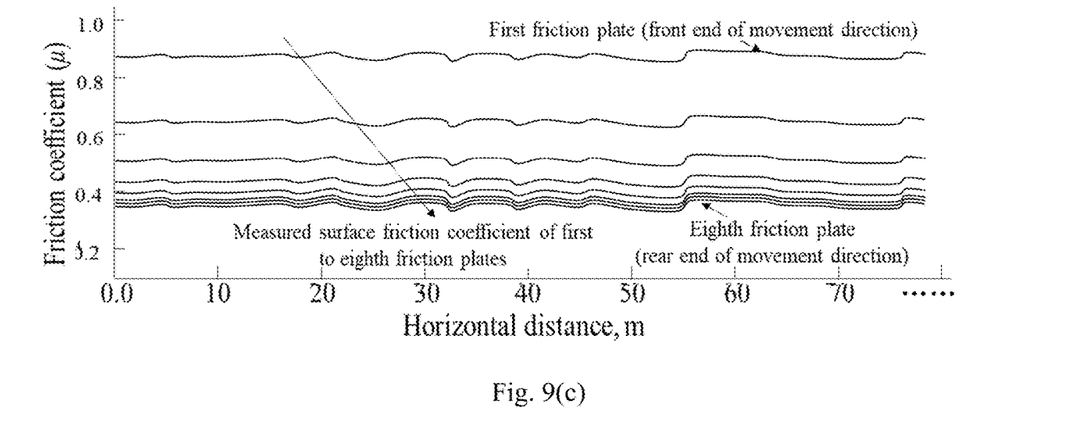

The friction coefficient between the soil and the structure is obtained by measuring the pressure and friction resistance of the friction plates 6 at the bottom end of the towing apparatus. In the towing process, the vertical pressure of the friction plates 6 is measured through the vertical tension-compression sensors 12. In the test, the change of the vertical pressure of the friction plates 6 is shown in FIG. 9(a). The horizontal friction force of the friction plates 6 is obtained through the measurement results of the tension-compression sensors 12 arranged laterally. In the test, the lateral friction force is shown in FIG. 9(b). According to the Coulomb friction criteria, the friction coefficient can be calculated through the following formula.

$$\mu = \frac{F_f}{F_N}$$

wherein $F_f$ is the lateral friction force of the friction plates 6 in the towing process, N; $F_N$ is the vertical pressure of the friction plates 6 in the towing process, N. The change of the friction coefficient in different positions in the towing process is shown in FIG. 9(c).

Figure 10B:
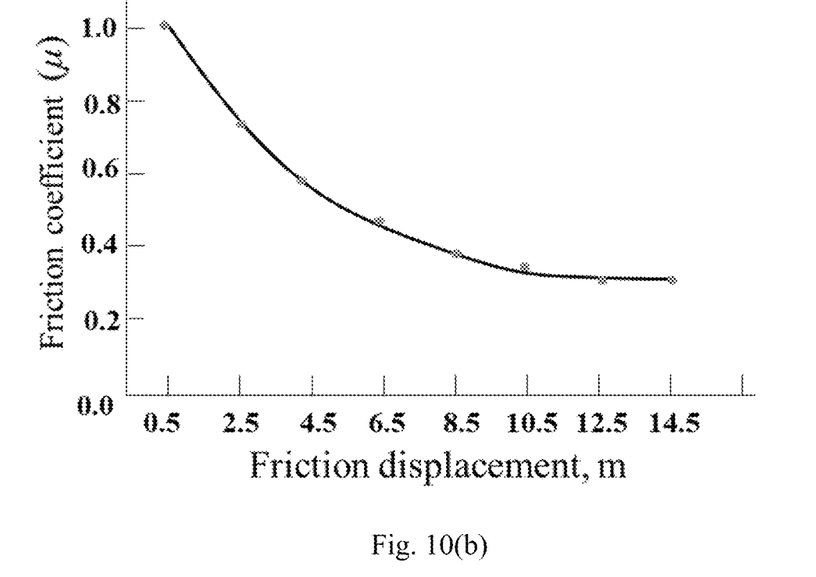

The friction coefficient of the soil in the same position is $$\mu_m = \frac{F_{f,m}}{F_{N,m}}$$

wherein $F_{N,m}$ is the vertical pressure of the mth friction plate 6 in the analysis position. The degradation relation of the friction coefficient with friction displacement, which is obtained after the test, is shown in FIG. 10(b).

The above only describes preferred embodiments of the present invention and is not intended to limit the present invention. For those skilled in the art, various variations and changes can be made to the present invention. Any modification, equivalent replacement, improvement, etc. made within the concept and principle of the present invention shall be included within the protection scope of the present invention.

The invention claimed is:

1. A lateral and continuous measurement method for soil parameters in a soft soil field, comprising the following measurement steps:

step 1: arranging soil strength measuring apparatuses at the front end of a towing apparatus: a plurality of soil strength measuring apparatuses are installed at the front end of the towing apparatus; voltage signals of the soil strength measuring apparatuses during lateral movement are collected; the resistance of the soil strength measuring apparatuses is determined according to a conversion relationship between the measured voltage signals and the resistance of the soil strength measuring apparatuses; and then the soil strength which changes continuously along the movement direction is obtained through the relationship between the obtained resistance and the soil strength;

step 2: arranging soil strain softening relationship measuring apparatuses at the bottom end of the towing apparatus: a plurality of soil strain softening relationship measuring apparatuses are installed at the bottom end of the towing apparatus; when the towing apparatus moves in the soil, the soil in the same position is disturbed by the plurality of soil strain softening relationship measuring apparatuses at the bottom end of the towing apparatus; the moving resistance of the soil strain softening relationship measuring apparatuses is obtained through the conversion relationship between the voltage signals and the resistance measured by the soil strain softening relationship measuring apparatuses; for the soil in the same position, the relationship between the resistance of the soil strain softening relationship measuring apparatuses and the number of the corresponding soil strain softening relationship measuring apparatuses of the disturbed soil is obtained; the relationship between the resistance and accumulated plastic strain is obtained in combination with the relationship between the number of the soil strain softening relationship measuring apparatuses of the disturbed soil and the accumulated plastic strain of the soil; the relationship between the soil strength and the accumulated plastic strain, i.e., the soil strain softening relationship, is finally determined in combination with the relationship between the resistance of the soil strain softening relationship measuring apparatuses and the soil strength;

step 3: measuring interface friction parameters between the soil and a structure: the bottom end of the towing apparatus is provided with a plurality of friction plates; the friction plates are connected to the bottom of the towing apparatus through tension-compression sensors to ensure that the lower surfaces of the friction plates come into contact with the soil and are on the same moving line; when the towing apparatus moves in the soil, the voltage signals of the tension-compression sensors are directly measured, and the friction and vertical pressure of the soil on the friction plates are obtained through the conversion relationship between the voltage signals and the force; for clay, the relationship between the friction resistance of the friction plates and accumulated relative displacement is finally obtained in combination with the relationship between the friction resistance of the friction plates in the same position in the soil layer and the number of the corresponding friction plates of the disturbed soil and the relationship between the number of the friction plates of the disturbed soil and the relative displacement of the soil; for sandy soil, a friction coefficient between the friction plates and the soil is obtained through the relationship between the friction resistance of the friction plates in the same position in the soil layer and the vertical pressure on the soil, and the relationship between the friction coefficient of the friction plates and the accumulated relative displacement is finally obtained in combination with the relationship between the number of the friction plates of the disturbed soil in the same position and the relative displacement of the soil;

step 4: the towing apparatus actively or passively moves in the soil layer to ensure that the towing apparatus partially penetrates into the to-be-measured soil layer during movement; and the penetration depth of the towing apparatus is controlled by adjusting counterweight above the towing apparatus and a towing angle.

2. The lateral and continuous measurement method for soil parameters in the soft soil field according to claim 1, wherein the installation number of the soil strength measuring apparatuses is increased with the increase of the depth of a to-be-measured soil layer; and an installation direction points to the moving direction of the towing apparatus.

3. The lateral and continuous measurement method for soil parameters in the soft soil field according to claim 1, wherein the installation direction of the soil strain softening relationship measuring apparatuses points to the movement direction of the towing apparatus to ensure that the plurality of soil strain softening relationship measuring apparatuses are positioned on the same moving line.

4. The lateral and continuous measurement method for soil parameters in the soft soil field according to claim 1, wherein the bottom end of the towing apparatus is provided with a plurality of grooves; the friction plates are arranged in the grooves; the friction plates are connected with tension-compression sensors installed in the grooves to ensure that the lower surfaces of the friction plates come into contact with the soil and are on the same moving line; one tension-compression sensor is parallel to the movement direction, and the other tension-compression sensor is perpendicular to the movement direction.

5. The lateral and continuous measurement method for soil parameters in the soft soil field according to claim 3, wherein the bottom end of the towing apparatus is provided with a plurality of grooves; the friction plates are arranged in the grooves; the friction plates are connected with tension-compression sensors installed in the grooves to ensure that the lower surfaces of the friction plates come into contact with the soil and are on the same lateral line; one tension-compression sensor is parallel to the movement direction, and the other tension-compression sensor is perpendicular to the movement direction.

6. The lateral and continuous measurement method for soil parameters in the soft soil field according to claim 1, wherein the soil strength measuring apparatuses are T-bar penetrometers, Ball-bar penetrometers or cone penetration test penetrometers; and the soil strain softening relationship measuring apparatuses are T-bar penetrometers or Ball-bar penetrometers.

7. The lateral and continuous measurement method for soil parameters in the soft soil field according to claim 3, wherein the soil strength measuring apparatuses are T-bar penetrometers, Ball-bar penetrometers or cone penetration test penetrometers; and the soil strain softening relationship measuring apparatuses are T-bar penetrometers or Ball-bar penetrometers.

8. The lateral and continuous measurement method for soil parameters in the soft soil field according to claim 4, wherein the soil strength measuring apparatuses are T-bar penetrometers, Ball-bar penetrometers or cone penetration test penetrometers; and the soil strain softening relationship measuring apparatuses are T-bar penetrometers or Ball-bar penetrometers.

9. The lateral and continuous measurement method for soil parameters in the soft soil field according to claim 1, wherein the data obtained by the method can also be used for determining over-consolidation ratio, sensitivity, relative density of sand, internal friction angle, compression modulus of soil, deformation modulus, undrained modulus of saturated clay, bearing capacity of foundation, bearing capacity of single pile and sand liquefaction discrimination parameter.

10. The lateral and continuous measurement method for soil parameters in the soft soil field according to claim 6, wherein the data obtained by the method can also be used for determining over-consolidation ratio, sensitivity, relative density of sand, internal friction angle, compression modulus of soil, deformation modulus, undrained modulus of saturated clay, bearing capacity of foundation, bearing capacity of single pile and sand liquefaction discrimination parameter.

* * * * *